United States Patent [15] 3,655,038
Mercade [45] Apr. 11, 1972

[54] METHOD FOR IMPROVING THE BRIGHTNESS OF GRAY SEDIMENTARY KAOLIN CLAY

[72] Inventor: Venancio V. Mercade, Metuchen, N.J.
[73] Assignee: Engelhard Minerals & Chemicals Corporation, Woodbridge, N.J.
[22] Filed: Feb. 12, 1970
[21] Appl. No.: 11,008

[52] U.S. Cl. ................................................209/5, 209/166
[51] Int. Cl. ..................................B03b 1/04, B03b 1/02
[58] Field of Search ...............................209/166, 167, 5

[56] References Cited

UNITED STATES PATENTS 3,337,048  8/1967  Mercade.............................209/166 X
3,353,668  11/1967  Duke.....................................209/10
3,410,399  11/1968  Hunter....................................209/5
3,439,802  4/1969  Mallary....................................209/5
3,503,499  3/1970  Allegrini....................................209/5

Primary Examiner—Frank W. Lutter
Assistant Examiner—Robert Halper
Attorney—Melvin C. Flint and Inez L. Moselle

[57] ABSTRACT

An improvement in a process for brightening gray sedimentary kaolin clay by oxidizing an aqueous pulp of the clay with ozone and subsequently removing Titania from a deflocculated pulp of the clay by flotation. A basic reagent capable of reducing the calcium ion concentration of the pulp is added after the ozone treatment and before the flotation treatment.

10 Claims, No Drawings

METHOD FOR IMPROVING THE BRIGHTNESS OF GRAY SEDIMENTARY KAOLIN CLAY

BACKGROUND OF THE INVENTION

Gray sedimentary kaolin clay, such as the clays mined near the McIntyre district of Georgia may be brightened by selectively floating a colored titaniferous impurity from the clay. One procedure, so-called "Ultraflotation," is described in U.S. Pat. No. 2,990,958 to Greene et. al. It has been suggested to oxidize a pulp of the clay before flotation to improve the flotation Reference is made to U.S. Pat. No. 3,353,668 to Duke. The preferred oxidizing agent suggested by Duke was potassium permanganate and this compound was employed with an acidic flocculated clay pulp. The subsequent flotation step, however, required the use of an alkaline, deflocculated pulp. The use of potassium permanganate left something to be desired because of the addition to the clay of ions which impaired the clay rheology under some conditions of use. It was discovered subsequently that ozone was effective in bleaching alkaline pulps of gray clay and that the pulps were amenable to titania removal by flotation. By using ozone before flotation, the flotation beneficiated clay was generally brighter than it would have been in the absence of the ozone pretreatment. In some cases, however, difficulty was experienced in deflocculating the ozone treated pulps to prepare them for flotation since the pulps tended to thicken and flocculate. The use of additional sodium silicate deflocculating agent did not overcome the problem.

An object of this invention is to provide a method for improving the brightness of gray kaolin clay by subjecting a previously ozonated pulp of the clay to flotation beneficiation.

A specific object of the invention is to provide a means for treating an ozonated pulp of gray kaolin clay so that optimum removal of titania may be effected when such pulp is deflocculated and subjected to flotation beneficiation.

This invention results from my unexpected discovery that calcium in gray kaolin clay was put into solution and the pH of the system was being reduced when a pulp of the clay was oxidized with ozone. The ultimate result was that the flotation of colored titania impurities was being impaired.

Stated briefly, in accordance with the present invention sedimentary gray kaolin clay containing small amounts of titaniferous and califerous impurities is brightened by a method comprising the steps of oxidizing an aqueous pulp of the clay, preferably an alkaline pulp, by passing ozone into the pulp, increasing the pH and also decreasing the calcium ion concentration of the aqueous phase of the pulp by adding a basic reagent capable of serving these functions, deflocculating the pulps with sodium silicate prior to flotation, subjecting the deflocculated alkaline pulp to flotation in the presence of an anionic carboxylic reagent selective to the flotation of colored titaniferous impurity and recovering the beneficiated, brightened clay.

For purposes of simplifying the description of the invention, the step of adding an alkaline reagent after ozone treatment is referred to as "pH correction" although it will be understood that such step requires the use of a reagent which will also decrease calcium ion concentration.

In a presently preferred embodiment of the invention, the following sequence of steps is followed: ozone is incorporated in an alkaline pulp of the clay, the reagent capable of correcting pH is added, the pulp is deflocculated with sodium silicate and then subjected to flotation. In an especially preferred form of this embodiment, an alkaline pulp of the clay is degritted before ozone treatment and the pulp is fractionated to produce a fine size fraction after being deflocculated with the sodium silicate.

In accordance with one form of the invention, the ozonated flotation beneficiated clay is recovered without using bleach reagents after flotation. Degritted gray kaolin clay having a low brightness of about 80 percent has been improved in brightness to a value in excess of 90 percent by such treatment. The fine size fraction of the clay had a brightness of 92 percent.

In another embodiment, still brighter clay products are obtained by following flotation treatment with a reducing bleach or an oxidation-reduction bleach in accordance with the teachings of the Duke patent (supra). Gray kaolin clays which have been processed in such manner have provided fine size fractions having brightnesses in the 93 to 94 percent range.

In accordance with a specially preferred embodiment of the invention, hydrogen peroxide is incorporated into a deflocculated slip or pulp of ozone-treated clay just prior to adding the anionic carboxylic reagent and subjecting the slip to flotation. Gray kaolin clay originally having a brightness of about 80 percent has been brightened to values in excess of 94 percent by including the hydrogen peroxide treatment with the ozone treatment. The addition of hydrogen peroxide to a clay flotation pulp prior to addition of anionic collector is disclosed and broadly claimed in my copending application, Ser. No. 41,086, filed May 27, 1970.

DESCRIPTION OF THE INVENTION

The term "gray" kaolin clay refers to those clays containing kaolinite as a major constituent and having a distinctive gray cast or hue which distinguishes them from other kaolin clays which have a creamy or sometimes yellow or orange tinge. Generally, the gray kaolins are classified as "hard" clays and the clay particles are much finer than the particles in soft crudes. Extensive deposits of hard gray clay are found near McIntyre, Georgia. These Georgia clays consist largely of kaolinite particles of which a major proportion are in the submicron particle size range. The raw clay as mined is unsuitable for use as a pigment and conventional clay processing such as degritting, fractionation and bleaching fails to result in a refined product having adequate brightness for such use. Colored impurities normally associated with sedimentary gray kaolin clays include a yellowish form of titania and a small amount of ferruginous matter. The gray color is possibly attributable to the presence of organic matter. Normally a small amount of calciferous matter (principally calcium carbonate) is present with gray kaolin clay. Since calcium minerals are generally white, the calcium content has not been considered significant in prior attempts to brighten the clay.

The raw clay as mined is an acid clay. The pH of a suspension (20 percent) of the clay in water is normally within the range of about 3 to 6, depending on the particular clay crude and the extent to which the crude has been aged in the presence of air.

In carrying out the present invention, I prefer to remove grit from the raw clay before processing the clay by subjecting it to ozone treatment and flotation. This may be done, for example, by blunging the clay in water at about 20 percent to 30 percent clay solids and fluidizing the slurry by adding an alkali having the ability to deflocculate the slurry. Soft water should be used to blunge the clay. Soda ash in amount sufficient to adjust pH to 9 may be used for this purpose although it is preferable to adjust the pH of the blunged clay to a value of about 6 before adding soda ash when processing crudes having pH values below about 5. (Reference is made to U.S. Pat. No. 3,410,399 to Hunter). The use of soda ash or sodium hydroxide and soda ash results in pulps which are sufficiently fluid to be degritted by sedimentation or screening. Pulps deflocculated with these reagents are less prone to flocculate during storage than they would be if sodium silicate were used at this point of the process. Excellent results have been obtained when soda ash or combinations of sodium hydroxide and soda ash have been used in amount to provide pulps having a pH of 9. The resulting pulps may be described as being "partially deflocculated" since addition of more powerful dispersants such as sodium silicate will generally further fluidize them.

Grit (e.g., particles or agglomerates lower than 325 mesh Tyler) may be removed from the partially deflocculated pulps by conventional means such as screening.

The degritted slurry may be stores, if desired, or it may be charged immediately to equipment capable of bubbling ozone therein as a finely dispersed gas. Details of suitable equipment are given in a copending application of Tom A. Cecil et al. Ser. No. 840,505, filed July 9, 1969, to which reference is hereby made.

Generally, sufficient ozone is bubbled in the aqueous pulp of impure gray kaolin clay to incorporate ½ to 10 lbs. of ozone per ton of clay in the slip. Preferred proportions vary with the clay crude. Especially recommended is the use of from about 1 to 6 lb./ton clay. Depending upon the nature of the clay and the ozone input into the slip, the clay generally brightens from ½ to 5 points on the G. E. brightness scale as a result of the ozone treatment. It is not presently known what colored impurities are decolorized by the ozone treatment. Chemical analyses indicate that the only significant chemical change which occurs during ozonation is a decrease in the calcium content of the clay in the pulp and a corresponding increase in the calcium ion content of the liquid phase of the pulp. It has also been observed that the pH of the clay pulp decreases as a result of the ozone treatment. For example, pulps having a pH of 9.0 before ozone treatment may have a pH within the range of about 8.3 to 8.6 after ozone has been incorporated. A reasonable explanation for the change in pH and calcium ion concentration is that the ozone oxidizes sufficient organic matter to form one or more acidic compounds. These acidic compounds cause some calcium carbonate to dissolve in accordance with the reaction represented by the equation:

$$CaCO_{3(s)} = Ca^{++} + CO_3^{--}$$

The clay pulp may be aged or stored after ozone treatment.

I prefer to correct the pH of the ozonated pulp before conditioning the slip with a sodium silicate deflocculating agent. The pH correction may be carried out with any basic compound capable of shifting the equilibrium between calcium carbonate and its ions towards the formation of calcium carbonate. Examples of such reagents are sodium carbonate, potassium carbonate, sodium hydroxide, potassium hydroxide, calcium oxide or hydroxide, barium hydroxide, barium carbonate. The preferred reagents are those which introduce no ions (e.g., barium ions) which would be precipitated on the clay during subsequent processing. Sodium carbonate is especially effective. The quantity of reagent required to restore pH to desired value may be determined by simple experimentation or it may be precalculated.

A normal quantity of sodium silicate will generally suffice to deflocculate the pulp adequately for fractionation and flotation. If desired the sodium silicate may be introduced as a hydrosol, in accordance with the teachings of U.S. Pat. No. 3,462,013 to Mercade. Generally, from about 2 to 8 lb./ton of a commercial sodium silicate solution such as "N" (38 percent solids, $SiO_2/Na_2O$ of 3.22/1) will be used to prepare the pulp for flotation. When the clay is fractionated before flotation, part of the sodium silicate may be added before fractionation and flotation and the remainder added before the pulp is conditioned for flotation. Alternatively, all of the sodium silicate may be incorporated before fractionation.

The cut or cuts made during fractionation will depend upon the desired particle size distribution of the end product or products. Generally, it is desirable to remove all plus 5 micron particles although the cut may be made at 3 microns or finer. To produce an extremely glossy pigment a fraction composed largely of particles finer than 1 micron may be obtained.

The reagents used to condition the deflocculated pulp for flotation vary with the flotation method that is used and include an anionic carboxylic reagent which is selective to the titania, such as oleic acid, tall oil acids (or soluble soaps thereof). When employing froth flotation, the "Ultraflotation'' process of U.S. Pat. No. 2,990,958 may be used. (This procedure utilizes an added "carrier" substance, preferably reagentized floatable calcite, to aid in the collection of the reagentized particles of colored titania.) The "scum" flotation process described in a copending application of Weir, Ser. No. 800,281, filed February 18, 1969, may be used. This procedure does not require a "carrier" and effects the collection of the reagentized titania in a quiescent or semiquiescent condition, forming a scum which is separated from a deflocculated slip of purified clay.

In an especially preferred embodiment of the invention, illustrated in Examples V and VI of this application, hydrogen peroxide is added to the flotation pulp just prior to adding the anionic carboxylic reagent. Recommended is the use of from 1 to 5 lb./ton hydrogen peroxide. After addition of the peroxide the flotation pulp should be conditioned (agitated) before adding the anionic carboxylic reagent. When using hydrogen peroxide in this manner the amount of ozone used may be substantially less than would be employed in the absence of the peroxide treatment. For example, excellent results have been realized with only 1 lb./ton ozone and 2 lbs./ton hydrogen peroxide.

After or during flotation, the titania is separated from a deflocculated slip of purified clay. The titania concentrate may be refloated to improve the recovery of clay and the slip of purified clay from the rougher purification may be further cleaned by flotation.

With a representative sample of degritted McIntyre gray clay, a well-floated unfractionated product may have a $TiO_2$ content below 0.4 percent. A minus 3 micron fraction of such product may analyze less than 0.3 percent $TiO_2$. An efficiently operated flotation may increase brightness by more than 5 points on the G. E. scale. Thus, for example, an 80 percent brightness degritted gray kaolin may be brightened to 84 percent by ozone treatment and be further brightened to 90 percent or more by subsequent flotation.

After flotation it may be desired to further bleach the clay by a hydrosulfite or a combination of an oxidant such as potassium permanganate and a reducing agent such as a hydrosulfite salt. To accomplish this, the slip of floated clay is flocced by addition of acid and usually thickened before bleaching.

When the deflocculated clay pulp is conditioned with hydrogen peroxide before addition of the anionic collector, additional bleaching will be effected by acidifying the slip of floated clay and aging this slip.

In the illustrative examples, all quantities are expressed on a weight basis.

Chemical analyses of clays are reported on a volatile-free clay weight basis. The volatile-free clay weight is determined by heating the clay to essentially constant weight at 1,800°F.

Clay brightness is determined by the procedure described in U.S. Pat. No. 2,990,958 (supra).

Particle size in the micron-size range is determined by sedimentation in water.

Deionized water was used in all processing steps.

The gray kaolin clays used in the examples were mined near McIntyre, Georgia and are representative of hard crude ores in that region.

EXAMPLE I

This example illustrates the advantage of treating an aqueous alkaline pulp of gray kaolin clay with ozone and then correcting the pH of the pulp by adding soda ash prior to removing colored impurities in the clay by froth flotation.

A sample of Georgia gray kaolin clay crude was blunged in water at 30 percent solids. The pH of the slurry was 5.4. Soda ash in amount of 4 lb./ton was added with agitation and the pulp was degritted over a 325 mesh (Tyler) screen. The degritted pulp of impure clay had a pH of 9.0 and contained about 25 percent clay solids.

Test A. In a control test in which ozone was not employed, the degritted pulp was dispersed by adding a previously formed dilute hydrosol formed by mixing a 5 percent aqueous solution of "N" sodium silicate solution with a 1 percent aqueous solution of alum in amount corresponding to 3.0 lb./ton "N" solution and 0.24 lb./ton alum. After addition of the hydrosol the pulp was agitated for 10 minutes. The dispersed (deflocculated) pulp was then conditioned for "Ultraflotation" in a Faglrgren conditioner for 30 minutes. The following reagents were used to condition the pulp and were added in the order listed:

"Drikalite"[1]   20% based on clay weight

| | |
|---|---|
| Ammonium sulfate | to pH 8.2 (added as a 5% solution) |
| Ammonium hydroxide | 2.0 lb./ton (added as an emulsion) |
| Tall oil acids | 6.0 lb./ton (added as an emulsion) |
| Eureka "M" oil | 8.0 lb./ton |

[1] High purity calcite having an average particle size of about 5 microns

The conditioned pulp was transferred to an Airflow flotation cell and a froth (a mixture of reagentized calcite and colored impurities) was withdrawn for 10 minutes. The froth was cleaned twice by froth flotation and the machine discharge products (deflocculated slips of purified clay) were combined. The combined machine discharge products were fractionated by sedimentation to produce a fine size fraction of clay substantially all of the particles of which were finer than 3 microns. Portions of the fractionated and unfractionated clay were bleached with prior art bleach reagents. Brightness measurements of clay products at different points of the process were obtained.

Test B. To study the effect of ozone pretreatment without pH correction, the control test (part A) was repeated with the exception that ozone gas was bubbled into the 25 percent solid degritted pulp (pH 9.0) in amount of 6 lb./ton. Immediately after addition of ozone the dilute hydrosol was added to the pulp using the same quantity of hydrosol that had been used in Test A. After the ozone had been added, the pH of the pulp dropped to a value of 8.3 and the pulp appeared to be partially flocculated.

Test C. To determine whether the difficulty encountered in carrying out Test B could be remedied by the simple expedient of using more deflocculating agent, Test B was repeated using a larger quantity of hydrosol (4.0 lb./ton "N" solution and 0.40 lb./ton alum). The pH of the slip after addition of this increased quantity of deflocculating agent was 8.9.

Test D. In accordance with a preferred embodiment of this invention, Test B (ozone pretreatment before deflocculation and froth flotation) was repeated with the exception that soda ash was added to the pulp and the pulp was agitated for 10 minutes after the treatment with ozone but before the hydrosol was added. The soda ash was added in amount of 1.2 lb./ton. The addition of the soda ash increased the pH of the slip from a value of 8.3 after ozone treatment to a value of 9.0. After addition of the soda ash the pulp appeared to be well deflocculated.

Test E. Still in accordance with this invention, Test C was repeated substituting 2.4 lb./ton barium hydroxide for the 1.2 lb./ton sodium carbonate used in Test C. After addition of barium hydroxide the pH of the ozone treated clay pulp was 9.0.

The properties of clay products at various points of the tests are summarized in Table I. The effect of processing variables on the flotation step per se are summarized in Table II.

| Test No. | Summary of process | Recovery of floated clay, wt. % | % TiO$_2$ in floated clay | Increase in brightness %* |
|---|---|---|---|---|
| A | No ozone | 83.8 | 0.51 | 4.3 |
| B | Ozone without pH correction | 84.9 | 0.68 | 3.9 |
| C | Ozone with added dispersant | 74.4 | 0.65 | 4.0 |
| D | Process of the invention | 87.7 | — | 5.3 |
| E | Process of the invention | 91.5 | 0.45 | 6.1 |

*Difference between brightness of degritted crude (after ozone treatment when used) and brightness after floatation.

A comparison of the percentage TiO$_2$ and unbleached brightness of the floated clay for tests A and B (Table I) shows that after flotation the clay was brighter but higher in titania when ozone was added to the clay pulp before deflocculation and flotation. Unbleached brightness data in Table I comparing the effect of oxidizing clay before flotation with ozone and the bleaching with a reducing agent (Test B) with the effect of floating the clay and then treating with an oxidizing agent (potassium permanganate), followed by a reducing agent (Test A), show that a brighter clay was obtained by the latter procedure. This was attributable to the higher titania content of the clay in Test B.

Results for Test C, in which additional deflocculating agent was used when pretreating the clay with ozone, show that the use of the additional deflocculating agent did not improve the properties of the ozone-pretreated floated clay.

Results in Table I for Tests D and E (the process of the invention) show that the addition of soda ash or barium hydroxide after ozone treatment and before deflocculation and flotation increased substantially the bleached and unbleached brightness of the floated clay. The unbleached clay, in fact, was only about one-half point lower in brightness than the floated clay of Test A in which oxidation was subsequent to flotation and a reducing bleach reagent was also used. The TiO$_2$ content of the floated clay of Test E (pH correction with barium hydroxide) was lower than that of Test A, demonstrating increased removal of titania during flotation. It will be recalled that ozone pretreatment decreased titania removal in the absence of pH correction (cf. the results of Tests A with those of Tests B and C).

The improvement in the flotation step per se is illustrated by data in Table II showing some of the significant metallurgical results for the flotation step. These data show that ozone pretreatment without pH correction was essentially without effect on the recovery of beneficiated clay (compare results of Tests A and B). The use of additional deflocculating agent

TABLE I

Effect of pH correction on properties of ozone pretreated, flotation beneficiated gray kaolin clay

| | Reagents, lbs./ton | | | | | Properties of floated clay | | Properties of fine size fraction of floated clay | | |
|---|---|---|---|---|---|---|---|---|---|---|
| Test No. | Ozone | Sodium silicate | Alum | Na$_2$CO$_3$ | Ba(OH)$_2$ | Unbleached brightness, percent | TiO$_2$, percent | Unbleached brightness, percent | Percent TiO$_2$ | Bleached brightness, percent |
| A | 0 | 3.0 | 0.24 | 0 | 0 | 86.6 | 0.51 | 89.2 | 0.34 | [1] 92.6 |
| B | 6 | 3.0 | 0.24 | 0 | 0 | 88.4 | 0.68 | 90.4 | 0.52 | [2] 91.6 |
| C | 6 | 4.0 | 0.40 | 0 | 0 | 88.5 | 0.65 | 90.7 | 0.47 | [2] 91.7 |
| D | 6 | 3.0 | 0.24 | 1.2 | 0 | 90.6 | — | 92.1 | — | [2] 92.7 |
| E | 6 | 3.0 | 0.24 | 0 | 2.4 | 89.8 | 0.45 | 92.0 | 0.32 | [2] 92.3 |

[1] Bleached with 2 lb./ton KMnO$_4$ plus 15 lb./ton Zn$_2$S$_2$O$_4$ at pH 3.
[2] Bleached with 9 lb./ton Zn$_2$S$_2$O$_4$ at pH 3.

TABLE II

EFFECT OF pH CORRECTION ON FROTH FLOTATION OF OZONE PRETREATED GRAY KAOLIN CLAY with ozone pretreatment (Test C) impaired clay recovery. However, the addition of soda ash or barium hydroxide after ozone pretreatment (Tests D and E) improved clay recovery.

Data in Table II for the increase in brightness as a result of flotation per se (exclusive of any increase due to ozonation) show that without pH correction (Tests B and C) the ozone pretreatment decreased the brightness effected during flotation. By correcting pH after ozonation (Tests D and E) the brightness improvement effected during the flotation step was increased.

The improved recovery of beneficiated clay and the improvement in brightness and reduction in titania during the flotation step per se conclusively demonstrate the value of the process of the invention as a means to improve the flotation beneficiation of a previously ozonated pulp of gray kaolin clay.

EXAMPLE II

Tests were carried out to determine the changes effected in the aqueous phase of a soda ash deflocculated slip as a result of treating such slip with 6 lb./ton ozone gas, as in Test B. The slips were filtered before and after chemical treatment and the filtrates were analyzed by conventional chemical methods. The results are summarized in Table III and show that the only significant change in the aqueous phase was an increase in calcium ion content indicating that calcium in the clay had dissolved. This increased the hardness of the water to 155 p.p.m. $CaCO_3$ and therefore changed the water from soft to hard. The unchanged content of organic matter indicates that any oxidation of organic matter, which would have been expected, was so minimal as to be undetectable by chemical analysis.

The amount of sodium carbonate required to precipitate the soluble calcium of the ozone treated slurry was computed and found to be 0.5 lb./ton. When using such quantity in a test which followed the procedure of Test D, excellent results were realized.

TABLE III

EFFECT OF OZONE ON SOLUBLES IN PULP OF GRAY KAOLIN CLAY

| Analysis g./g. clay | Before ozonation | After ozonation |
|---|---|---|
| $Ca^{++}$ | $2.9 \times 10^4$ | $3.9 \times 10^4$ |
| Total salts | $17.5 \times 10^4$ | $17.7 \times 10^4$ |
| $SO_4^{--}$ | $5.0 \times 10^4$ | $5.0 \times 10^4$ |
| Organic matter | $1.9 \times 10^4$ | $1.9 \times 10^4$ |

EXAMPLE III

To demonstrate the effectiveness of sodium hydroxide as an agent to improve the flotation of a previously ozonated clay pulp, the procedure of Test D was repeated with the following exceptions. The collector was 9.0 lb./ton of a 50/50 mixture of the tall oil acids and Calcium Petronate (a 50 percent solution of calcium petroleum sulfonate in mineral oil) and 0.2 lb./ton sodium hydroxide was added instead of 1.2 lb./ton sodium carbonate, the caustic being added as a 5 percent aqueous solution. Test D was then repeated with the 50/50 collector mixture and 1.2 lb./ton sodium carbonate to correct pH.

It was found that sodium hydroxide was almost as effective as soda ash. This may be explained by the fact that the equilibrium represented by the following equation was shifted to the left by the increased hydroxyl ion concentration resulting from addition of the sodium hydroxide.

$$CaCO_{3(s)} + H_2O = Ca^{++} + HCO_3^- + OH^-$$

EXAMPLE IV

Experiments were conducted to determine the effect of substituting strong oxidizing agents for ozone in tests similar to those of Test D of Example I. The oxidizing agents tested included hydrogen peroxide, sodium hypochlorite and sodium chlorite. After the oxidizing agent had been added to the degritted pulp of gray kaolin clay (80.6 percent brightness) the pulp was aged for about 20 hours at ambient temperature. For purposes of comparison ozone was used in amounts of 3 lb./ton and 6 lb./ton followed by addition of 1 lb./ton soda ash. Results are summarized in Table IV.

Data in Table IV show that when hydrogen peroxide, sodium hypochlorite and sodium chlorite were added to aqueous pulps of impure gray kaolin clay before such pulps were deflocculated and beneficiated by flotation, the brightness of the flotation beneficiated gray kaolin clay was not improved as it was when the pulp was treated with ozone, followed by pH correction, in accordance with the present invention.

TABLE IV

A comparison of the effect of pretreating gray kaolin clay with various oxidizing agents prior to flotation beneficiation

| | | Clay brightness, percent | | | | |
|---|---|---|---|---|---|---|
| Oxidizing agent | Quantity | Original | After oxidation | After flotation | $-3\mu$ fraction of floated clay | $-3\mu$ fraction of floated, bleached* clay |
| None | | 80.6 | | 86.6 | 87.9 | 88.5 |
| $H_2O_2$ | 4 | 80.6 | 81.2 | 87.0 | 88.2 | 89.1 |
| $NaO_2Cl$ | 4 | 80.6 | 80.6 | 86.7 | 87.9 | 90.1 |
| $NaOCl$ | 8 | 80.6 | 81.1 | 86.5 | 87.5 | 88.3 |
| $O_3$ | 3 | 80.6 | 85.2 | 88.5 | 90.3 | 91.3 |
| $O_3$ | 6 | 80.6 | 84.6 | 89.4 | 91.1 | 92.0 |

*3 lb./ton $Zn_2S_2O_4$ and pH 3.

EXAMPLE V

This example illustrates an especially preferred embodiment of the invention wherein a degritted pulp of gray kaolin clay is treated with ozone, following which the pH of the ozonated pulp is corrected by addition of soda ash, deflocculated with sodium silicate and activated for flotation by conditioning with hydrogen peroxide before addition of an anionic carboxylic collector reagent.

A series of tests was carried out with the same gray clay used in the previous example (80.6 percent brightness after degritting). In carrying out these tests various amounts of ozone were added to the degritted pulps before the dispersion step. After addition of the ozone, the pH of all pulps was adjusted to 9.0 by addition to the slip in the conditioner as of soda ash. In carrying out some of the tests, hydrogen peroxide was added to the slip in the conditioner as a 3 percent solution. When used, the peroxide was added after the calcite carrier and ammonium sulfate solution were added. After addition of peroxide the slip was conditioned for 10 minutes. An emulsion of the collector reagent (6 lb./ton tall oil acids, 2 lb./ton ammonium hydroxide) was then added. Total conditioning time was 30 minutes. After conditioning the slips were subjected to "Ultraflotation" with one rougher flotation and one froth cleaner. The machine discharge products were combined and a minus 3 micron fraction was recovered by sedimentation. In some tests these products were further bleached by addition of 9 lb./ton zinc hydrosulfite at a pH of about 3. The results are summarized in Table V.

TABLE V

Brightening gray kaolin clay by pretreatment with ozone and flotation of hydrogen peroxide activated clay

| Oxidizing agent, lbs./ton | | Properties of $-3$ micron fraction of oxidized flotation beneficiated clay | | |
|---|---|---|---|---|
| Ozone | Hydrogen peroxide activator | Percent $TiO_2$ | Brightness, percent | |
| | | | Unbleached | Bleached with $Zn_2S_2O_4$ |
| 0 | 0 | 0.47 | 87.9 | 88.5 |
| 0 | 4 | 0.40 | 89.0 | 90.2 |
| 3 | 0 | 0.56 | 90.3 | 91.3 |
| 3 | 4 | 0.37 | 91.6 | 92.6 |
| 6 | 0 | 0.47 | 91.1 | 92.7 |
| 6 | 4 | 0.38 | 91.7 | 93.2 |

Data in Table V show that the use of 3 lb./ton ozone in combination with 4 lb./ton hydrogen peroxide was more effective in terms of titania removal and brightness (bleached and unbleached) than was the use of either of these reagents when used singly. The data for the tests using 6 lb./ton ozone with 4 lb./ton peroxide indicate that the bleached brightness was improved by the use of additional ozone but that the use of the smaller quantity of ozone, when used in conjunction with hydrogen peroxide, sufficed to produce a product having a brightness in excess of 91.5 percent with the use of a reducing bleach.

EXAMPLE VI

The procedures of Example V were applied to a pulp of gray Georgia kaolin which had been degritted in a plant scale operation after being blunged with soda ash. The clay pulp was treated with 1 lb./ton ozone, thereby reducing pH to 8.35 and increasing clay brightness to 83.1 percent. A 5 percent soda ash solution was added in amount of 1 lb./ton to bring pH to 8.95. The pulp was dispersed with a hydrosol containing 3.0 lb./ton of "N" solution and 0.24 lb./ton alum, bringing the pH to 9.0. After the hydrosol was added the pulp was agitated in a Fagergren cell with the air inlets closed for 10 minutes. The pulp was then conditioned in the Fagergren cell with the following reagents, which were added in the order listed: "Drikalite," 20 percent based on the weight of the clay; ammonium sulfate, 6 lb./ton, added as a 5 percent solution; a 3 percent solution of hydrogen peroxide (when used) in amounts ranging from 2 to 8 lb./ton; an emulsion containing ammonium hydroxide, 2 lb./ton, as a 2.5 percent solution, and 6 lb./ton tall oil acids; Eureka "M" oil, 8 lb./ton. The pulp was conditioned for 1 minute after addition of the ammonium sulfate solution, 10 minutes after addition of hydrogen peroxide (when used), 5 minutes after the emulsion of tall oil acids was added and 25 minutes after the hydrocarbon oil was added.

The results obtained are summarized in Table VI.

TABLE VI

Brightening gray kaolin by ozone pretreatment followed by flotation of hydrogen peroxide activated clay

| Oxidizing agent, lbs./ton | | Flotation machine discharge | | | Minus 3 micron fraction of floated clay | | | |
|---|---|---|---|---|---|---|---|---|
| | | | | | | Brightness, percent | | |
| Ozone | $H_2O_2$ | Recovery, percent | Brightness, percent | $\Delta F.$[1] | Percent $TiO_2$ | Unbleached | Bleached [2] | Bleached [3] |
| 1 | 0 | 89.6 | 88.2 | 5.1 | 0.36 | 89.8 | 91.2 | 92.9 |
| 1 | 2 | 88.4 | 88.9 | 5.8 | 0.35 | 90.5 | 92.3 | 93.2 |
| 1 | 4 | 83.6 | 89.0 | 5.9 | 0.31 | 90.7 | 92.4 | 93.3 |
| 1 | 8 | 87.4 | 89.0 | 5.9 | 0.31 | 91.0 | 92.9 | 93.5 |

[1] $\Delta F.$ represents increase in brightness as a result of flotation per se (brightness after ozone treatment=83.1%).
[2] Bleach A=9 lb./ton $Zn_2S_2O_4$.
[3] Bleach B=2 lb./ton $KMnO_4$ plus 15 lb./ton $Zn_2S_2O_4$.

Data in Table VI show that when using only 1 lb./ton ozone with pH correction, fine size fractions of flotation purified clay having unbleached brightness values about 90 percent could be obtained when the ozone-treated clay was activated for the flotation with from 2 to 8 lb./ton hydrogen peroxide. Bleaching these floated products with zinc hydrosulfite resulted in pigments having brightness values in excess of 92 percent. When the floated products were bleached with a combination of potassium permanganate and zinc hydrosulfite, brightnesses exceeded 93 percent.

A comparison of data for results obtained with the use of 2, 4 and 8 lb./ton hydrogen peroxide prior to addition of the collector shows that the advantage of using more than 2 lb./ton hydrogen peroxide was minimal.

I claim:

1. In a method for brightening gray sedimentary kaolin clay containing a colored titania impurity and also containing calciferous and organic impurities wherein an aqueous alkaline pulp of the impure clay is treated with ozone in amount sufficient to increase the brightness of the clay, the previously ozone-treated pulp is deflocculated with sodium silicate and thereafter subjected to flotation in the presence of an anionic carboxylic reagent selective to the flotation of the titania impurity and a slip of purified brightened clay is recovered, the improvement which comprises adding a sufficient quantity of a soluble basic compound to the pulp to decrease the calcium ion concentration and increase the pH of the ozone-treated pulp said basic compound being added prior to deflocculating the alkaline pulp with sodium silicate and subjecting the deflocculated pulp to flotation.

2. A method for improving the brightness of crude gray sedimentary kaolin clay containing a colored titania impurity and also containing calciferous and organic impurities which comprises
   agitating said kaolin crude in water in the presence of sufficient alkali metal carbonate salt to provide a fluid alkaline pulp,
   removing grit from said pulp,
   bubbling ozone into the pulp in amount sufficient to increase the brightness of the clay,
   incorporating an alkaline reagent capable of increasing the pH and decreasing the calcium ion concentration of the pulp,
   deflocculating the pulp by addition of sodium silicate,
   subjecting said pulp to flotation in the presence of an anionic carboxylic collector for the titania impurity in the clay, producing a slip of brightened clay having a reduced titania content and a concentrate of titania,
   and recovering said slip of brightened clay.

3. The method of claim 2 wherein said reagent capable of decreasing the calcium ion concentration is sodium carbonate.

4. The method of claim 2 wherein said reagent capable of decreasing the calcium ion concentration is sodium hydroxide.

5. The method of claim 2 wherein said reagent capable of decreasing the calcium ion concentration is barium hydroxide.

6. A process for brightening gray sedimentary kaolin clay containing a titania impurity and small quantities of calcium carbonate mineral and organic impurities which comprises agitating said clay in water in the presence of soda ash to produce a fluid pulp having a pH above 8.5, bubbling ozone into the pulp in amount sufficient to brighten the clay, whereby the pH of the pulp decreases and the calcium ion concentration increases, increasing the pH of the pulp to a value of about 9.0 with an alkaline reagent which decreases the calcium ion concentration, deflocculating the pulp by addition of sodium silicate, subjecting the pulp to flotation beneficiation in the presence of an anionic carboxylic reagent selective to the flotation of titania and recovering a slip of beneficiated, brightened clay.

7. The method of claim 6 wherein said alkaline reagent is soda ash.

8. A method for improving the brightness of gray kaolin clay containing as impurities discrete colored titania and small amounts of calcium carbonate and organic matter which comprises agitating said clay in water in the presence of soda ash to produce a pulp having a pH of about 9, degritting the pulp, bubbling ozone gas into the pulp in amount sufficient to brighten the clay, thereby reducing pH below 9, incorporating an alkaline compound capable of decreasing calcium ion concentration in amount sufficient to increase pH to about 9, deflocculating the pulp by addition of sodium silicate, conditioning the deflocculated pulp for the selective flotation of colored titania with hydrogen peroxide and shortly thereafter with an anionic carboxylic reagent, subjecting the conditioned pulp to flotation, producing a float product which is a concentrate of titania impurity and a deflocculated slip of purified clay, and recovering said slip of purified clay.

9. The method of claim 8 wherein said alkaline reagent is soda ash.

10. The method of claim 6 wherein said sodium silicate is modified by addition of a dilute aqueous solution of alum.

* * * * *

UNITED STATES PATENT OFFICE
CERTIFICATE OF CORRECTION

Patent No. 3,655,038               Dated April 11, 1972

Inventor(s) Venancio V. Mercade

It is certified that error appears in the above-identified patent and that said Letters Patent are hereby corrected as shown below:

Column 1 - line 29, insert -- THE INVENTION -- as a heading;
line 44, "califerous" should read -- calciferous --.

Column 7 - line 54 of TABLE III, "$Ca^{--}$" should read -- $Ca^{++}$ --.

Signed and sealed this 12th day of September 1972.

(SEAL)
Attest:

EDWARD M. FLETCHER, JR.                ROBERT GOTTSCHALK
Attesting Officer                      Commissioner of Patents